(12) United States Patent
Fujita et al.

(10) Patent No.: US 7,307,927 B2
(45) Date of Patent: Dec. 11, 2007

(54) OPTICAL DISK APPARATUS AND METHOD FOR RECORDING AND REPRODUCING AN OPTICAL DISK

(75) Inventors: Shinji Fujita, Yokohama (JP); Fumio Isshiki, Yokohama (JP); Nobuyuki Maeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 556 days.

(21) Appl. No.: 10/879,779

(22) Filed: Jun. 30, 2004

(65) Prior Publication Data
US 2005/0052964 A1    Mar. 10, 2005

(30) Foreign Application Priority Data
Sep. 4, 2003    (JP)    ............................. 2003-312986

(51) Int. Cl.
*G11B 7/00*    (2006.01)

(52) U.S. Cl. ............................. 369/44.29; 369/112.01

(58) Field of Classification Search .................... None
See application file for complete search history.

(56) References Cited

U.S. PATENT DOCUMENTS

| | | | | |
|---|---|---|---|---|
| 6,771,584 B2 * | 8/2004 | Yamanaka | ............. | 369/112.23 |
| 6,967,916 B2 * | 11/2005 | Sano et al. | ............... | 369/53.12 |
| 7,012,875 B2 * | 3/2006 | Shimano et al. | ........ | 369/112.02 |
| 7,142,484 B2 * | 11/2006 | Ando et al. | ............... | 369/44.23 |
| 2001/0028614 A1 * | 10/2001 | Furukawa | ................. | 369/44.32 |

FOREIGN PATENT DOCUMENTS

| | | |
|---|---|---|
| JP | 2000-011388 | 1/2000 |
| JP | 2000-57616 | 2/2000 |
| JP | 2001-222838 | 8/2001 |
| JP | 2001-307349 | 11/2001 |
| JP | 2001-351255 | 12/2001 |
| JP | 2003-123282 | 4/2003 |

* cited by examiner

*Primary Examiner*—Thang V. Tran
*Assistant Examiner*—Peter Vincent Agustin
(74) *Attorney, Agent, or Firm*—McDermott Will & Emery LLP (57) ABSTRACT

A method and an optical disk apparatus that can accurately and stably correct the spherical aberration even for a blank write-once optical disk and can detect a spherical aberration error signal with a simple construction of parts in real time. In a blank write-once disk 20, the tracking servo is switched to an inoperative state, push-pull signals from outputs of the photodetector 12 are detected in a state of "in focus" and in a state of "out focus," respectively, by a push-pull signal generation circuit 34, and the amplitudes of these push-pull signals are subjected to difference calculation in a spherical aberration error detector 31 to obtain a spherical aberration error signal A. Then, the spherical aberration is corrected with this spherical aberration error signal A, and subsequently a specific pattern signal is recorded in a trial writing area, this signal is reproduced in the state of "in focus" and in the state of "out focus," respectively, the amplitude of each reproduced signal is acquired by a reproduced signal generation circuit 32, these amplitudes are subjected to difference calculation in the spherical aberration error detector 31 to obtain a spherical aberration error signal B. The spherical aberration is corrected with this.

2 Claims, 8 Drawing Sheets

OPTICAL DISK APPARATUS AND METHOD FOR RECORDING AND REPRODUCING AN OPTICAL DISK

BACKGROUND OF THE INVENTION

1. Field of the Invention

This invention relates to a optical disk, especially to an optical disk apparatus for correcting the spherical aberration generated by variation in substrate thickness of an optical disk, and an optical pickup therefor.

2. Description of the Related Art

The optical disk apparatus functions as an information recording/reproducing apparatus that features capability of high-speed access of a large volume of information in a non-contact manner, in a changeable manner, and at a low cost. Making good use of these features, it finds applications as a recording/reproducing apparatus of digital audio signals or digital image signals, or as an external storage device for a computer.

An optical pickup used for this optical disk apparatus generally adopts a configuration comprising: a laser light source of a wavelength corresponding to the optical disk; a diffraction grating for dividing a beam emitted from this light source into three beams; an objective lens for focusing these three beams on an information recording surface of the optical disk with a predetermined NA (Numeral Aperture); a photodetector for converting reflected beams from the optical disk into electric signals; and a beam separating element for guiding these reflected beams to this photodetector, wherein a reproduced information signal and a focusing error signal are detected based on a main beam that is a zero-order diffracted beam of these three reflected beams. And a tracking error signal is detected based on this main beam and sub-beams that are two +first-order diffracted beams. In particular, in the case of a recording optical pickup, it is common to arrange the light spots by the sub beams on the optical disk with a predetermined positional relationship to its track pitch and detect the tracking error signal by the differential push-pull method.

Meanwhile, the optical disk has become denser along with the increase of data amount to be handled with. In contrast to the CD whose capacity is about 700 MB, the DVD with about 4.7 GB has come to be commercialized and widely used. Moreover, a large capacity disk (Blue-ray Disc.) whose capacity is more than 20 GB, for recording high-definition image signals for two hours, are being put to practical use.

The recording density of an optical disk is restricted by the size of a light spot focused on its information recording surface. The size of a light spot is proportional to the wavelength of its beam and inversely proportional to NA (Numerical Aperture); therefore, in order to realize high-density of an optical disk, it is necessary to shorten the wavelength of the beam and enlarge the NA.

Here, it should be noted that when the wavelength of a beam is shortened and the NA is enlarged, aberration increases rapidly due to inclination of the optical disk (hereinafter referred to as "disk inclination") and an error of the substrate thickness of the optical disk (hereinafter referred to as disk substrate thickness). In addition, in the case of the disk inclination, the comatic aberration increases in proportion to the NA to the third power, to the reciprocal of the wavelength of the beam, and to the disk substrate thickness. For this reason, there is known a technology in which the disk substrate thickness is thinned, responding to increased NA and shortened wavelength. For example, in the Blu-ray Disc, the disk substrate thickness is made thin down to 0.1 mm in comparison to 0.6 mm of the DVD, whereby an allowable margin for the disk inclination is made comparable to that of the DVD.

On the other hand, regarding the error of the disk substrate thickness, the spherical aberration increases in proportion to this error of the disk substrate thickness, the NA to the fourth power, and the reciprocal of the wavelength of the beam. If taking the Blu-ray Disc as an example, an allowable value of the error of the disk substrate thickness will decrease to about $\frac{1}{10}$ of that of the DVD. Moreover, in the case of the optical disk with a dual layer structure consisting of two information recording layers, the separation of these information recording layers generates spherical aberration in the same manner as the error of the disk substrate thickness. For this reason, in the high-capacity, high-density optical disk that requires high NA, the correction of the spherical aberration becomes necessary according to its recording layers as well.

For an optical pickup for correcting such spherical aberration, well known is a technology whereby the spherical aberration generated by the error of the disk substrate thickness or the spacing of the information recording layers is canceled by another spherical aberration that can be obtained by adopting anyone of: the first configurations that includes a beam expander for imparting predetermined spherical aberration in an optical path of the beam; the second configuration that includes a liquid crystal device for imparting predetermined spherical aberration; and the third configuration that imparts spherical aberration by changing a lens-to-lens distance of a two-lens objective in a focusing direction.

JP-A No. 11388/2000 proposes that one concrete example of a method for detecting a control signal used for the correction of the spherical aberration and its correction procedure.

The JP-A No. 11388/2000 discloses a technology in which the focus offset is wobbled at a predetermined frequency, or a lens-to-lens distance of a two-lens objective is wobbled at a predetermined frequency lower than this frequency, and the amount of focus offset and the lens-to-lens distance of the objective lens, namely the spherical aberration, are adjusted based on a difference of the amplitude of the information signal RF reproduced from the optical disk between these peaks of wobbling (maximum point and minimum point).

JP-A No. 57616/2000 discloses another method in which the reflected beam from an optical disk is divided and received in inner and outer light-receiving areas of a photodetector, respectively, a signal that varies depending on the spherical aberration is detected as a differential signal of the amounts of light received in the inner and outer light-receiving areas, and the spherical aberration is corrected based on this signal.

The JP-A No. 57616/2000 discloses a technology that provides an optical disk apparatus equipped with an eight-part photodetector—such that each part of the common four-part photodetector is further divided into inner and outer parts—in the detection optics based on the so-called astigmatism method and for obtaining a control signal for correcting the spherical aberration by dividing the reflected beam from the optical disk into inner and outer portions and receiving them.

JP-A No. 307349/2001 discloses another method of using an optical disk apparatus that is equipped with a diffraction grating for separating the reflected beam from an optical disk into two beams, and is configured to receive the respective beams thus separated in inner and outer light-receiving areas of a photodetector independently, and obtain a control signal for correcting the spherical aberration from outputs of this photodetector.

Since JP-A No. 11388/2000 discloses a technology of detecting the spherical aberration by using a wobbling-caused change in the amplitude of a signal reproduced from the optical disk, it cannot be applied to any optical disks in which no information signal RF is recorded, such as a write-once optical disk (write-once disk) in a not-yet-recorded state. Moreover, since it is a technology of detecting the spherical aberration by performing wobbling, if defocus or the spherical aberration is intended to be adjusted while the amount of spherical aberration is being detected, the adjustment will be performed during the wobbling, and hence an optimal adjustment will not be performed. For this reason, it is impossible to detect the amount of spherical aberration during recording/reproduction operations; therefore, it is difficult to detect the spherical aberration in real time during recording/reproduction operations and at the same time perform the correction of the spherical aberration based on this.

With the technology described in the JP-A No. 57616/2000, it is difficult to extract signal lines from light-receiving areas, especially from four inner light-receiving areas of the eight-part photodetector. In addition, since the number of independent signal lines is eight only in the main light-receiving area, the number of necessary amplifiers increases, which brings a problem in terms of size and cost when a photodetector with internal amplifiers (OEIC) is constructed. Furthermore, depending on change in the ambient temperature, a relative positional shift may occur between the reflected beam and a light-receiving surface of the photodetector. In this case, a detected signal of the spherical aberration will have an offset, and hence accurate correction of the spherical aberration becomes difficult. That is, it becomes a problem in terms of reliability against environmental changes.

With the technology disclosed in the JP-A No. 307349/2001, the optical pickup is configured in such a way that four or more light spots are received by a single photodetector, and consequently a light receiving pattern of the photodetector becomes complex and its area becomes large. Even further, since the number of independent signals is large, the number of necessary amplifiers becomes large, and hence it size and cost become a problem when constructing a photodetector with internal amplifiers (OEIC). In addition, there are problems that adjustment of making a plurality of light spots to be received accurately at corresponding positions in the light-receiving surface, respectively, becomes necessary, the adjustment is difficult to achieve, and the adjustment takes a long time.

SUMMARY OF THE INVENTION

The object of this invention is to solve such problems and to provide a method for recording/reproducing an optical disk, an optical disk apparatus, and an optical pickup that make possible accurate and stable correction of the spherical aberration even for a blank write-once disk so that recording quality and reproduction quality are improved.

Another object of this invention is to provide a method for recording/reproducing an optical disk, an optical disk apparatus, and an optical pickup that enable the spherical aberration to be detected and corrected in real time with a simple construction of parts at the time of recording and reproduction, so that the recording quality and reproduction quality are improved.

A first aspect of the invention resides in a method for recording/reproducing an optical disk in which a beam is focused on the optical disk by the use of an optical pickup, a reflected beam from this optical disk is detected by a photodetector, from output signals of the photodetector the focusing error signal is detected and the tracking error signal is detected by the push-pull method, wherein push-pull signals and reproduced information signals in a state of "in focus" and in a state of "out focus" are detected, respectively, a first spherical aberration error signal that varies depending on the amplitudes of these push-pull signals in the state of "in focus" and in the state of "out focus" is detected, a second spherical aberration error signal that varies depending on the amplitude of these reproduced information signals in the state of "in focus" and in the state of "out focus" is detected, and spherical aberration is corrected based on the first and second spherical aberration error signals.

A second aspect of the invention resides in a method for recording/reproducing an optical disk in which the zero-order diffracted beam and the ± first-order diffracted beams that differ from each other in convergence/divergence states are focused on the optical disk by using an optical pickup, three reflected beams from this optical disk are detected in respective light-receiving areas each corresponding to each reflected beam in the photodetector, and the focusing error signal and the tracking error signal are detected from output signals from this photodetector, wherein a first spherical error signal that varies depending on a difference between the amplitude of a push-pull signal by the photodetector receiving the (+) first-order diffracted beam and the amplitude of a push-pull signal by the photodetector receiving the (−) first-order diffracted beam is generated, a second spherical error signal that varies depending on a difference between the amplitude of a reproduced by the photodetector receiving the (+) first diffracted beam and the amplitude of a reproduced signal by the photodetector receiving the (−) first-order diffracted beam is generated, and spherical aberration is corrected based on the first and second spherical aberration error signals.

A third aspect of the invention resides in an optical disk apparatus comprising: (1) an optical pickup that is composed of a light source, an objective lens for focusing the beam emitted from this light source on an information recording layer of the optical disk, an objective lens actuator, a spherical aberration correction element for adjusting the spherical aberration of a beam entering this objective lens, and a photodetector for receiving reflected beams from this optical disk and detecting the focusing error signal, and the tracking error signal by the push-pull method; (2) a drive circuit that drives the objective lens actuator and sets it either in the state of "in focus" state or in the state of "out focus"; (3) a means for detecting the push-pull signals and the reproduced information signals in the state of "in focus" being set and in the state of "out focus" being set from the outputs of the photodetector; (4) a means for generating the first spherical aberration error signal that varies depending on the amplitudes of the push-pull signals detected in the state of "in focus" and in the state of "out focus" and, respectively, for generating the second spherical aberration error signal that varies depending on the reproduced information signals detected in the state of "in focus" and in the state of "out focus," respectively, and (5) A means for correcting the spherical aberration of the light spot by controlling the spherical aberration correction element according to the first and second spherical aberration error signals.

A fourth aspect of the invention resides in an optical disk apparatus comprising: (1) an optical pickup composed of a light source, a hologram element for separating three beams: the zero-order diffracted beam and the ± first-order diffracted beams that differ from each other in convergence/divergence states as a result of mutually different lens powers from the beam emitted from this light source, an objective lens for focusing these three beams on an information recording layer of the optical disk, the spherical aberration correction element for adjusting the spherical aberration of beams entering this objective lens to a predetermined value, and a photodetector for receiving reflected beams from this optical disk and detecting the focusing error signal, and the tracking error signal by the push-pull method; (2) a means for generating a first spherical aberration error signal that varies depending on a difference between the amplitude of a push-pull signal obtained by this photodetector receiving the (+) first-order diffracted beam and the amplitude of a push-pull signal obtained by this photodetector receiving the (−) first-order diffracted beam; (3) a means for generating a second spherical aberration error signal that varies depending on a difference between the amplitude of a reproduced signal obtained by this photodetector receiving (+) first-order diffracted beam and the amplitude of are produced signal obtained by this photodetector receiving the (−) first-order diffracted beam; and (4) a means for correcting the spherical aberration of the light spot by controlling the spherical aberration correction element according to the first and second spherical aberration error signals.

A fifth aspect of the invention resides in an optical pickup comprising: a light source, a hologram element for separating three beams: the zero-order diffracted beam and the ± first-order diffracted beams that differ from each other in convergence/divergence states as a result of mutually different lens powers from a beam emitted from this light source, an objective lens for focusing these three beams on an information recording layer of the optical disk, the spherical aberration correction element for adjusting the spherical aberration of beams entering this objective lens to a predetermined value, and a photodetector for receiving the zero-order diffracted beam, the (+) first-order diffracted beams, and the (−) first-order diffracted beams reflected from this optical disk in mutually different light-receiving area sand detecting the focusing error signal according to respective amounts of light received and the tracking error signal by the push-pull method.

In the fifth aspect, the optical pickup is also constructed such that a cutoff frequency fc in the light-receiving areas for the ± first-order diffracted beams of the photodetector satisfies $$fc > fn$$

where fn is a frequency that corresponds to a combination of the longest marks and the longest spaces recorded on the optical disk.

The method for recording/reproducing an optical disk according to this invention enables accurate and stable correction of the spherical aberration not only when information signals are reproduced from the optical disk but also for blank write-once disks, improving the recording quality and reproduction quality.

The method for recording/reproducing an optical disk according to this invention enables a spherical aberration error signal to be detected in real time with a simple construction of parts almost identical to that of the conventional, common optical pickup, improving the recording quality and reproducing quality.

The optical disk apparatus according to this invention enables the spherical aberration to be corrected in real time during recording/reproduction operations, improving the recording quality and reproduction quality.

DETAILED DESCRIPTION OF THE PREFERRED EMBODIMENTS

Embodiments of this invention will be described below, referring to the drawings.

The reference numerals used in the figures are as follows: 1 is an optical pickup, 2 is a laser light source, 3 is a hologram element, 4 is a collimator lens, 5 is a polarizing beam splitter, 6 is a quarter-wave plate, 7 is a spherical aberration correction element, 8 is a total reflection mirror, 9 is an objective lens, 10 is an objective lens actuator, 11 is a detection lens, 12 is a photodetector, 13 is a photodetector, 20 is an optical disk, 21 is a spindle motor, 30 is a system control circuit, 31 is a spherical aberration error detector, 32 is a reproduced signal generation circuit, 33 is a servo signal generation circuit, 34 is a push-pull signal generation circuit, 35 is a spherical aberration correction element drive circuit, 36 is a laser drive circuit, 37 is an actuator drive circuit, 38 is a feed motor drive circuit, 39 is a spindle-motor drive circuit, 50 is a main spot light-receiving area, 51 is a (+) first-order subspot light-receiving area, 52 is a (−) first-order subspot light-receiving area, 60 is a main spot, 61 is a (+) first-order subspot, 62 is a (−) first-order subspot.

Figure 1:
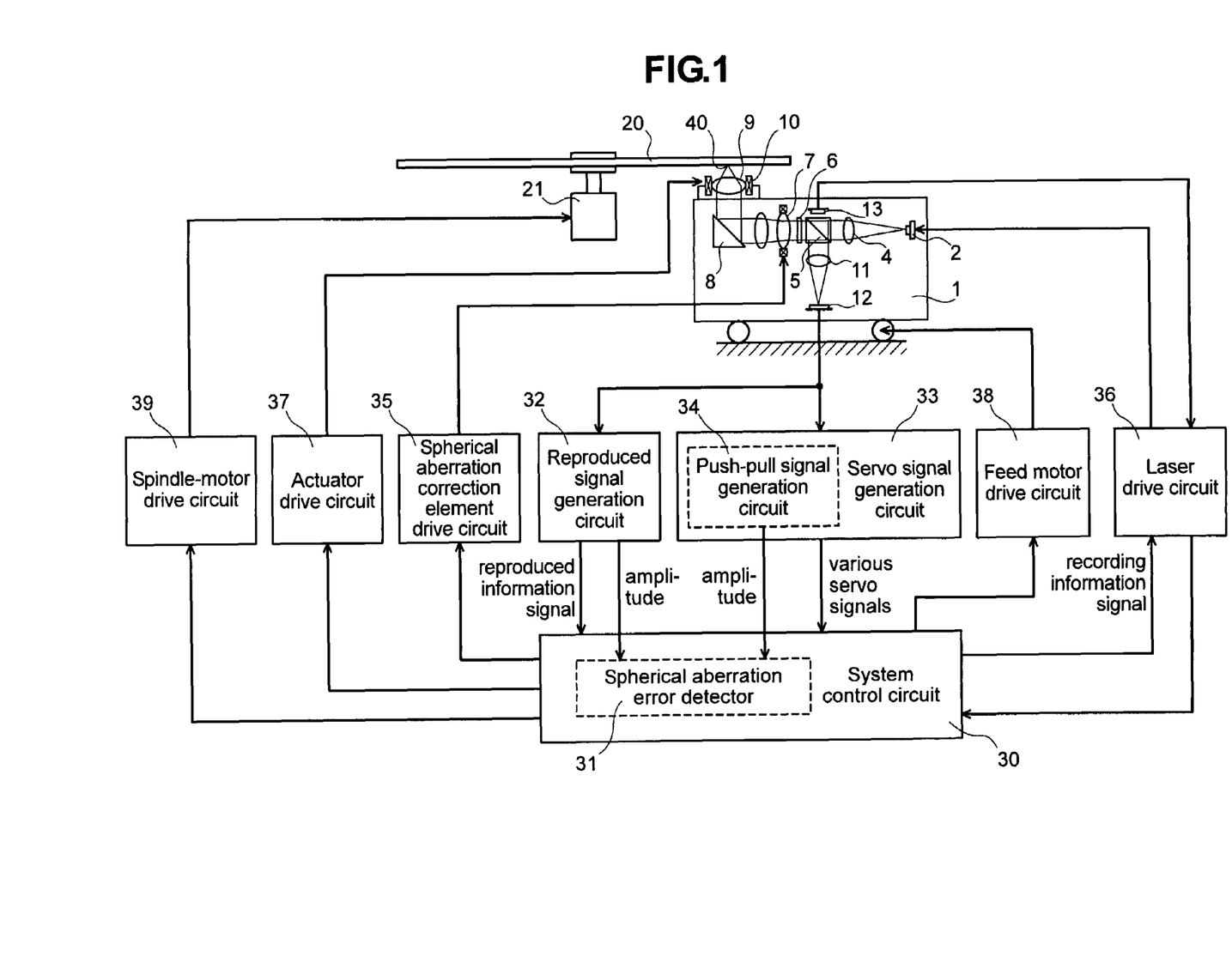
FIG. 1 is a block diagram showing a first embodiment of the method for recording/reproducing an optical disk, an optical disk apparatus, and an optical pickup according to this invention.

FIG. 1 is a block diagram showing the first embodiment of the method for recording/reproducing an optical disk, the optical disk apparatus, and the optical pickup according to this invention. In FIG. 1, 1 is the optical pickup, 2 is the laser light source, 4 is the collimator lens, 5 is the polarizing beam splitter. 6 is the quarter-wave plate, 7 is the spherical aberration correction element, 8 is the total reflection mirror, 9 is the objective lens, 10 is the objective lens actuator, 11 is the detection lens, 12, 13 are the photodetectors, 20 is the optical disk, 21 is the spindle motor, 30 is a system control circuit, 31 is a spherical aberration error detector, 32 is the reproduced signal generation circuit, 33 is the servo signal generation circuit. 34 is the push-pull signal generation circuit, 35 is the spherical aberration correction element drive circuit, 36 is the laser drive circuit, 37 is the actuator drive circuit, 38 is the feed motor drive circuit, 39 is a spindle-motor drive circuit, and 40 is a light spot.

In FIG. 1, in order to reproduce or record/reproduce information signals from/on the mounted optical disk 20, the optical pickup 1 comprises: the laser light source 2 for emitting a beam of laser light of wavelength λ corresponding to this optical disk 20; the collimator lens 4 for converting the beam emitted from this laser light source 2 to a collimated beam; the polarizing beam splitter 5 for transmitting predetermined linearly polarized light roughly 100% and reflecting linearly polarized light orthogonal to this linearly polarized light roughly 100%; the quarter-wave plate 6 for converting linearly polarized light to circularly polarized light and converting circularly polarized light to linearly polarized light; the total reflection mirror 8; the objective lens 9 for forming the light spot 40 with less aberration on a predetermined information recording layer of the optical disk 20 at a predetermined NA from the beam emitted from this total reflection mirror 8; the objective lens actuator 10 for displacing this objective lens 9 in a focusing direction and in a tracking direction; and the spherical aberration correction element 7 for adjusting the spherical aberration of a beam entering the objective lens 9 and correcting the spherical aberration of the light spot 40 on the optical disk 20 caused by the substrate thickness error of the optical disk 20 etc.

The beam of linear polarization emitted from the laser light source 2 is converted to the collimated beam by the collimator lens 4. The polarizing beam splitter 5 has a function of transmitting predetermined linearly polarized light roughly 100% and reflecting linearly polarized light orthogonal to this linearly polarized light roughly 100%. In this first embodiment, the polarizing beam splitter 5 is configured to transmit the beam of linear polarization emitted from the laser light source 2 to pass roughly 100% and reflect a part thereof. Next, the beam having passed through the polarizing beam splitter 5 is converted to circularly polarized light by the quarter-wave plate 6, imparted predetermined spherical aberration by the spherical aberration correction element 7, and subsequently guided to the objective lens 9 after being reflected by the total reflection mirror 8. The objective lens 9 forms the light spot 40 in the information recording layer of the optical disk 20 corresponding to the beam that entered it.

The reflected beam from the optical disk 20 passes through the objective lens 9, the total reflection mirror 8, and the spherical aberration correction element 7 again, and is converted to linearly polarized light that is orthogonal to the linearly polarized light emitted from the laser light source 2 by the quarter-wave plate 6. Because of this, this reflected beam is reflected roughly 100% by the polarizing beam splitter 5, converted to a predetermined convergent beam by the detection lens 11, and guided to the photodetector 12.

This spherical aberration correction element 7 is a beam expander that is made up of a combination of two lenses whose lens-to-lens distance is variable, and is for adjusting the spherical aberration of a transmitted beam by changing this lens-to-lens distance. It should be noted that this invention is not limited to this; for example, the spherical aberration correction element 7 may be a liquid crystal device that has a concentric pattern and can correct the spherical aberration by giving a phase difference between the inner part and the near-circumference part of the beam.

The optical pickup 1 is equipped with the photodetector 12 for receiving the reflected beam from the optical disk 20 and converting it to electric signals that vary depending on the intensity variation of the reflected beam, and the photodetector 13 for receiving a part of the beam emitted from the laser light source 2 and converting it to an electric signal. The electrical signals outputted from the photodetector 12 are supplied to the reproduced signal generation circuit 32 and the servo signal generation circuit 33. The reproduced signal generation circuit 32 obtains the reproduced information signal of the information recorded on the optical disk 20; the servo signal generation circuit 33 detects various servo signals, such as the focusing error signal and the tracking error signal. Especially regarding the tracking error signal, the servo signal generation circuit 33 is configured so that a push-pull signal generation circuit 34 therein can detect the tracking error signal by the push-pull method.

For this purpose, the four-part photodetector equipped with four light-receiving areas that are made by division of the light-receiving surface with two parting lines, being parallel to a tangential direction and parallel to a radial direction of the optical disk 20, is used as the photodetector 12. Generally, the tracking error signal is obtained as a differential signal (hereinafter referred to as the push-pull signal) of an output signal that varies depending on the amounts of light received of the two light-receiving areas located on one side with reference to the parting line lying in this tangential direction and an output signal that varies depending on the amounts of light received of the two light-receiving areas located on the other side. By using this four-part photodetector and installing a cylindrical lens between the detection lens 11 and the photodetector 12, the focusing error signal can be detected by the astigmatism method.

The system control circuit 30 has a function of controlling operations of this whole optical disk apparatus. That is, the system control circuit 30 performs rotation control of the mounted optical disk 20 on the spindle motor 21 through the spindle-motor drive circuit 39, performs access control and feed control by driving the optical pickup 1 in the radial direction of the optical disk 20 through the feed motor drive circuit 38, performs focusing control and tracking control by driving the objective lens actuator 10 through the actuator drive circuit 37, and further corrects the spherical aberration by driving the spherical aberration correction element 7 of the optical pickup 1 through the spherical aberration correction element drive circuit 35. Incidentally, a detection principle of the spherical aberration and its correction procedure will be described in detail later.

The system control circuit 30 drives this laser light source 2 through the laser drive circuit 36 so that the amount of light emitted becomes a predetermined amount of light based on an output of the photodetector 13 that is built in the optical pickup 1 to monitor an output of the laser light source 2. Thereby, at the time of recording, the system control circuit 30 supplies a recording information signal to the laser drive circuit 36, and this laser drive circuit 36 drives the laser light source 2 based on this recording information signal. The laser light source 2 emits a laser beam at an optical intensity and pulse width (write strategy) that correspond to this recording information signal.

The reflected beam from the optical disk 20 is received by the photodetector 12 and converted to electric signals, which are sent to the reproduced signal generation circuit 32 and the servo signal generation circuit 33. The servo signal generation circuit 33 selects and generates various servo signals by a suitable detection method according to the mounted optical disk 20, and supplies them to the system control circuit 30. The system control circuit 30, based on these supplied servo signals, drives the objective lens actuator 10 through the actuator drive circuit 37, and puts the focusing servo and the tracking servo in operation.

The servo signal generation circuit 33 is equipped with the push-pull signal generation circuit 34, which detects the amplitude of the push-pull signal, especially at the time when the tracking servo is inoperative, and supplies its amplitude information to a spherical aberration error detector 31 provided in the system control circuit 30. This push-pull signal is one that is detected as described above in the case where the photodetector 12 is the four-part photodetector. Moreover, the reproduced signal generation circuit 32 generates the reproduced information signal from the optical disk 20, at the same time detects the amplitude of this reproduced information signal, especially that at the time of a tracking servo operation, and supplies this amplitude information to the spherical aberration error detector 31. The spherical aberration error detector 31 detects an error of the amount of spherical aberration with reference to a previously set standard amount (hereinafter referred to as spherical aberration error) based on amplitude information of these supplied signals: the push-pull signal and the reproduced information signal. The system control circuit 30 corrects the spherical aberration of the optical pickup 1 so that this spherical aberration error may be vanished by driving the spherical aberration correction element 7 through the spherical aberration correction element drive circuit 35 based on this spherical aberration error.

Figure 2:
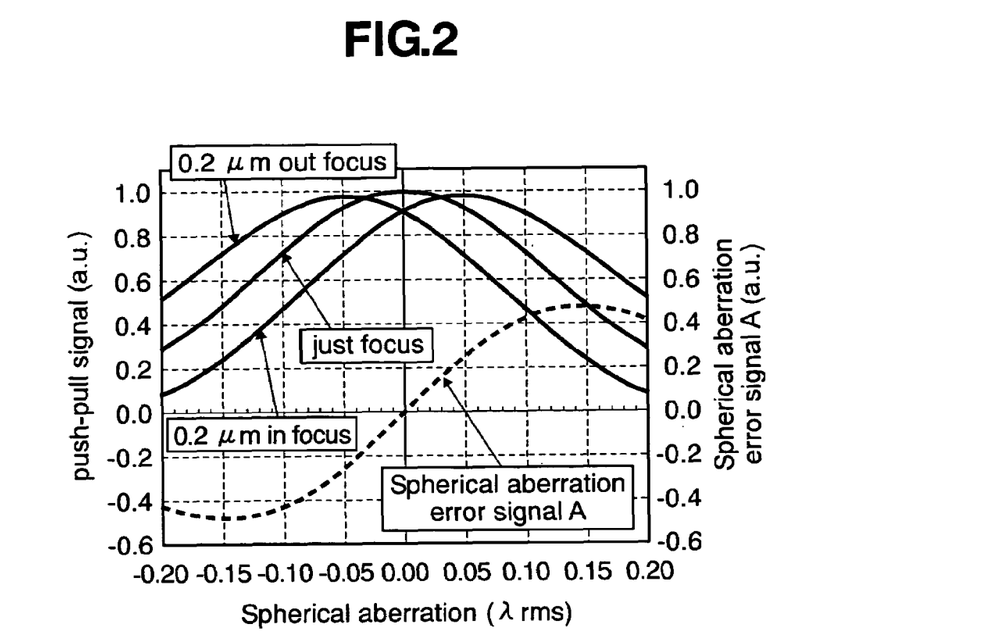
FIG. 2 is a characteristics diagram showing a relationship between the spherical aberration and the amplitude of the push-pull signal, and the spherical aberration error signal in the first embodiment shown in FIG. 1.
Figure 3:
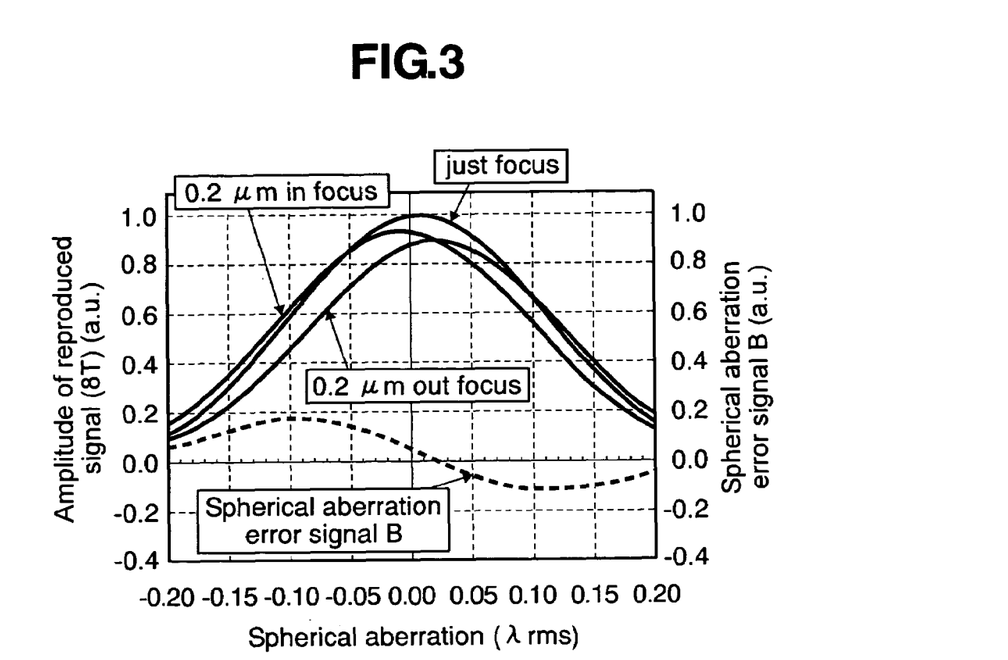
FIG. 3 is a characteristics diagram showing a relationship between the spherical aberration and the amplitude of the reproduced information signal, and the spherical aberration error signal in the first embodiment shown in FIG. 1.

Here, a detection principle of the spherical aberration will be described referring to FIGS. 2 and 3. FIG. 2 is the characteristics diagram showing one concrete example of the relationship between the spherical aberration and the amplitude of the push-pull signal, and FIG. 3 is the characteristics diagram showing one concrete example of the relationship between the spherical aberration and the amplitude of the reproduced information signal of a specific pattern. The both are showing calculation results by simulation.

In FIG. 2, the horizontal axis represents the amount of spherical aberration, and spherical aberration corresponding to the direction of increasing the disk substrate thickness is designated as positive. The vertical axis represents the amplitude of the push-pull signal normalized so that the amplitude of the push-pull signal in an ideal state (no aberration and in-focus state) is unity. In this description, note that a state of the objective lens being in defocus coming near the optical disk 20, as a result of driving the objective lens actuator 10, is referred to as "in focus," and contrary to this, a state of the objective lens being in defocus leaving away from the optical disk 20 is referred to as "out focus." A state of the objective lens 9 being in focus (normal terminology) is referred to as "just focus."

As shown in FIG. 2, in a just focus state, the amount of spherical aberration at which the amplitude of the push-pull signal becomes the largest is zero. Contrary to this, in the state of "in focus" (here, 0.2 µm) and in the state of "out focus" (here, 0.2 µm), the amplitude of the push-pull signal become the largest at a predetermined positive amount of spherical aberration and at a predetermined negative amount of spherical aberration, respectively. Here, calculation of the difference of the amplitude of the push-pull signal at the time of "in focus" and the amplitude of the push-pull signal at the time of "out focus" yields a characteristic as shown by the dotted lines. Since this characteristic takes positive values in a positive range of spherical aberration, takes negative values in a negative range of spherical aberration, and bears a linearity in a predetermined range including a zero-cross point; this difference becomes a suitable signal as a servo signal. Hereafter, this differential signal of the amplitudes of the push-pull signals at the time of "in focus" and "out focus" is referred to as the spherical aberration error signal A. When this spherical aberration error signal A is zero, the amount of spherical aberration becomes almost zero.

In FIG. 3, the horizontal axis represents the amount of spherical aberration as with FIG. 2, and its sign is identical to that in FIG. 2. The vertical axis represents the amplitude of the reproduced information signal normalized so that the amplitude of the reproduced information signal in the ideal state is unity. However, here, the reproduced information signal is specified to be an information signal of an 8T fixed pattern sufficiently long to the light spot size.

As shown in FIG. 3, the amount of spherical aberration at which the amplitude of the reproduced information signal becomes the largest is zero in the just focus state; whereas the amplitude of the reproduced information signal becomes the largest at a predetermined negative amount of spherical aberration at the time of "in focus" (here, 0.2 µm), and at a predetermined positive amount of spherical aberration at the time of "out focus" (here, 0.2 µm), respectively. Here, calculation of a difference between the amplitude of the reproduced information signal at the time of "in focus" and the amplitude of the reproduced information signal at the time of "out focus" yields a signal that has a linearity in a predetermined range including a zero-cross point and is suitable for servo control, as shown by the dotted line. Hereafter, the differential signal of the amplitude of the reproduced information signal between at the time of "in focus" and at the time of "out focus" is referred to as the spherical aberration error signal B. When this spherical aberration error signal B is zero, the amount of spherical aberration becomes almost zero.

Since both spherical aberration error signals A, B depend on variation in the amplitude of a signal at the time of defocus, if the focusing error signal has an offset caused by variation in assembly of the optical pickup 1, an offset will be produced also in these spherical aberration error signals A, B. Accordingly, next, an initial procedure for adjusting the spherical aberration and focus offset to a blank write-once disk that is intended to remove this offset will be described.

Figure 4:
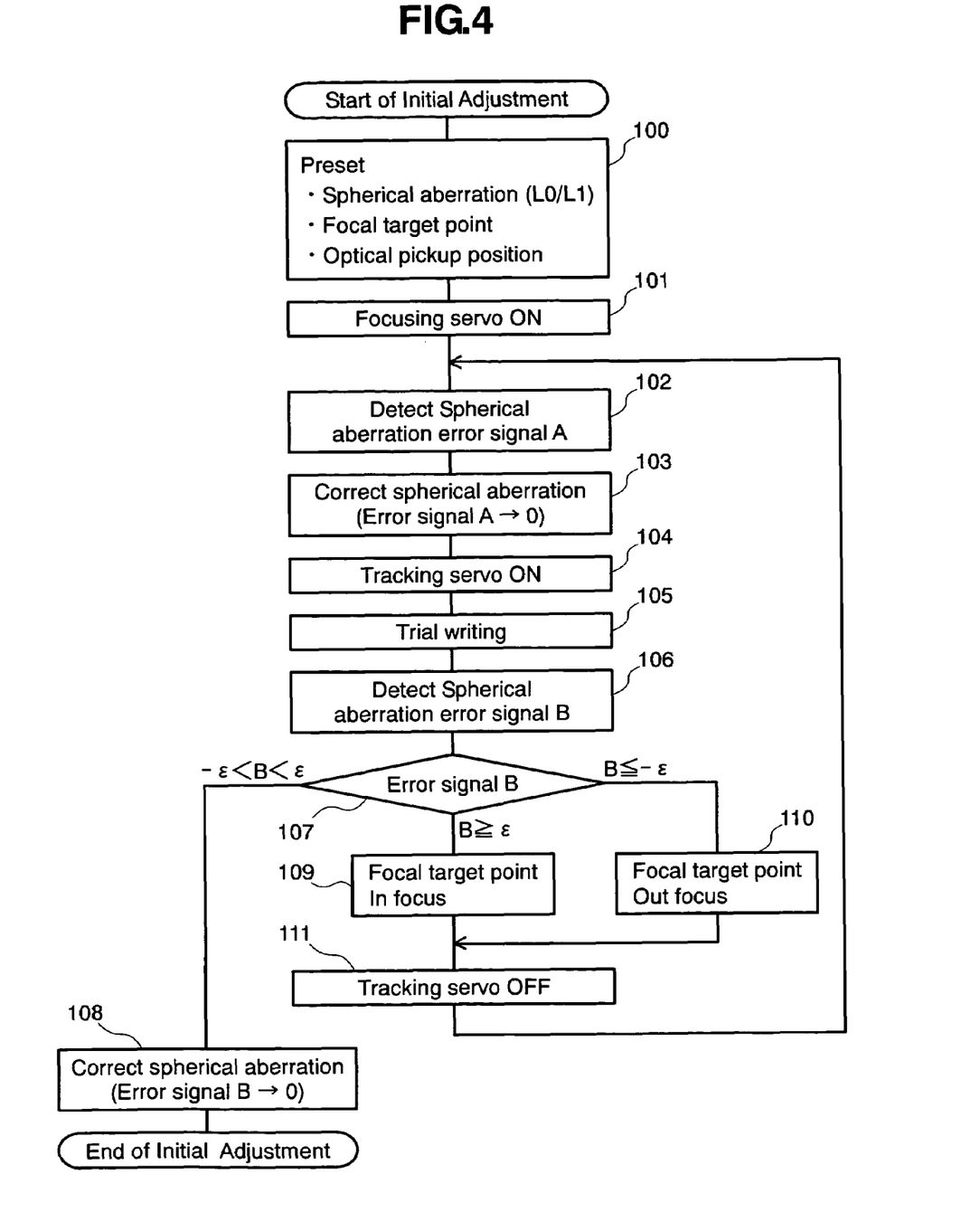
FIG. 4 is a flowchart showing one concrete example of initial operations for adjusting the spherical aberration and focus offset to a blank write-once disk of the first embodiment shown in FIG. 1.

FIG. 4 is a flowchart showing one concrete example of this initial procedure for adjusting the spherical aberration and focus offset to a blank write-once disk.

In FIG. 4, first in Step 100, a target point of the focusing serve is set to a preset value (here, the preset value is assumed as zero). The spherical aberration correction element 7 is driven according to the information recording layer of the mounted optical disk 20, and the amount of spherical aberration is set to a preset value. For example, in the case where the information recording layer is made up of dual layers: layer L0 and layer L1, the spherical aberration correction element 7 is set to a different position according to whether the information recording layer on/from which an information signal is recorded/reproduced is the layer L 0 or the layer L1. In addition, a position of the optical pickup 1 is set so that recording/reproduction of this information signal is performed in a predetermined trial writing area with the optical disk 20. Note that it is assumed that a target point of the tracking servo, a laser recording power, a write strategy, etc. are set to preset values in advance in order to make the explanation simple.

Once presetting of this initial value is ended, the focusing servo is made to operate based on the focusing error signal that was detected by the optical pickup 1 (Step 101), and the spherical aberration error signal A is detected from the amplitude of the push-pull signal obtained at the time when the tracking servo is inoperative, as described above (Step 102). For this purpose, the optical pickup 1 is moved from the target point of the focusing servo in an "in focus" direction by a predetermined quantity (for example, 0.2 μm) and the amplitude of the push-pull signal is detected by the push-pull signal generation circuit 34, and similarly, the optical pickup 1 is moved therefrom in an "out focus" direction by the same quantity and the amplitude of the push-pull signal is detected. Then, these amplitudes are subjected to difference calculation, whereby the spherical aberration error signal A is generated.

Note that although in this embodiment, the optical disk apparatus is configured to be for setting the target point of the focusing servo, it may be configured to apply a bias on the focusing error signal.

Based on this spherical aberration error signal A, the spherical aberration correction element 7 is driven so that this spherical aberration error signal A becomes below a predetermined value (here, becomes zero) (Step 103).

Note that this processing of Steps 102, 103 may consist of a loop in which the step of detecting the spherical aberration error signal A and the step of correcting the spherical aberration by driving the spherical aberration correction element 7 based on this spherical aberration error signal A are repeated together with the step of judging the end of correction based on this spherical aberration error signal A.

The tracking servo is operated, the light spot 40 is positioned on a predetermined track assigned in the trial writing area (Step 104), and an information signal is trial-written at a predetermined recording power and with a predetermined write strategy (Step 105).

Incidentally, the information signal to be recorded is, as an example, a fixed pattern signal of long marks/spaces that makes it possible to secure the percentage modulation sufficiently. It should be noted, however, that this invention is not limited to this; the fixed pattern may be a fixed pattern of short marks and spaces, or may be a random signal consisting of marks and spaces of various lengths.

The information signal that was trial-written is reproduced and the spherical aberration error signal B explained in FIG. 3 is detected (Step 106). As described above and as in the case of the spherical aberration error signal A, the spherical aberration error signal B is generated as follows: the optical pickup 1 is moved to effect "in focus" and "out focus" while the tracking servo is being operated, the amplitude of the reproduced information signal is detected in each state, these amplitudes thus detected are subjected to difference calculation to find their difference.

On the basis of previously set thresholds $+\epsilon$, $-\epsilon$, judging of the spherical aberration error signal B is done (Step 107).

In this judgment processing, if the inequality $-\epsilon<B<+\epsilon$ (namely, $|B|<|\epsilon|$) stands, the objective lens actuator 10 is controlled through the spherical aberration correction element drive circuit 35 so that the spherical aberration error signal B becomes zero (Step 108), and the initial setting is ended. Note that, this Step 108 may consist of a loop in which the step of detecting the spherical aberration error signal B and the step of correcting the spherical aberration by driving the spherical aberration correction element 7 based on this detected spherical aberration error signal B are repeated together with the step of judging the end of correction based on this spherical aberration error signal B.

In the judgment processing of Step 107, if the spherical aberration error signal B is equal to or less than the threshold $-\epsilon$, namely $B \leq \epsilon$ stands, the focal target point is moved in the "out focus" direction by a predetermined quantity (for example, 0.05 μm) away from the focal target point currently being set (Step 110). If the spherical aberration error B is equal to or more than a threshold value $+\epsilon$, that is, $+\epsilon \leq B$ stands, the focal target point is moved in the "in focus" direction from the focal target point (=0) currently being set by a predetermined quantity (for example, 0.05 μm) (Step 109). Then, in either of these defocus states, the tracking servo is switched to an inoperative state again (Step 111) and operations from Step 102 are repeated. This operation is repeated as long as the inequality $|\epsilon| \leq |B|$ stands, and at every repeat the focal target position is changed as described above (Steps 109,110). If the inequality $|B|<|\epsilon|$ is satisfied for this altered focal target point (Step 107), the objective lens actuator 10 is controlled through the spherical aberration correction element drive circuit 35 so that the spherical aberration error signal B becomes zero (Step 108), and then the initial adjustment process is ended at this altered focal target point.

Here, operations in the case where an offset exists in the focusing error signal caused by assembly variation of the optical pickup 1 will be described.

Figure 5:
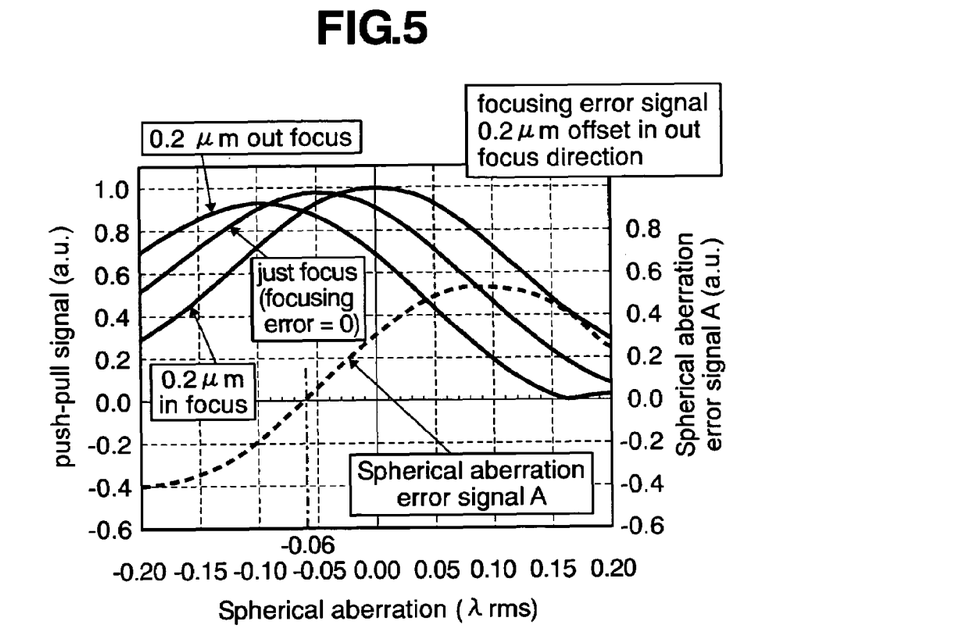
FIG. 5 is a characteristics diagram showing a relationship between the spherical aberration and the amplitude of the push-pull signal, and the spherical aberration error signal in the case where the optical pickup has an initial focus offset in the first embodiment shown in FIG. 1.
Figure 6:
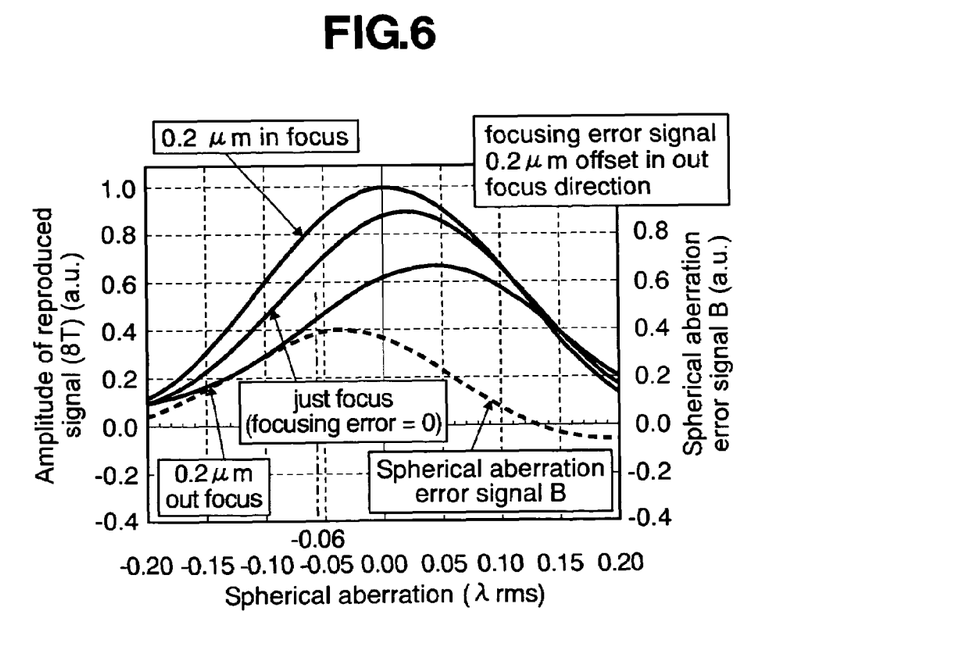
FIG. 6 is a characteristics diagram showing a relationship between the spherical aberration and the amplitude of the reproduced information signal, and the spherical aberration error signal in the case where the optical pickup has an initial focus offset in the first embodiment shown in FIG. 1.

FIG. 5 is a characteristic diagram showing a relationship between the spherical aberration and the amplitude of the push-pull signal, and the spherical aberration error signal A in the case where the focusing error signal of the optical pickup 1 has an offset, and the optical pickup 1 is in the state of "out focus" of 0.2 μm in the initial state (focusing error signal=0, despite being in the state of "out focus" of 0.2 μm). Similarly, FIG. 6 is a characteristic diagram showing a relationship between the spherical aberration and the amplitude of the reproduced information signal, and the spherical error signal B in the case where the focusing error signal of the optical pickup 1 has an offset and the optical pickup 1 is in the state of "out focus" of 0.2 μm in the initial state (focusing error signal=0).

Where the focusing error signal has an offset, if the spherical aberration correction element 7 is driven so that the spherical aberration error signal A becomes zero in Step 103 of FIG. 4, the optical pickup 1 will be adjusted actually so as to have an amount of spherical aberration of about $-0.06$ λ, as shown in FIG. 5. In a state of this spherical aberration, when the spherical aberration error signal B is detected in Step 106 of FIG. 4; as shown in FIG. 6, this spherical aberration error signal B becomes a value of about 0.4, and it turns out that the spherical aberration and focus offset have shifted. Then, in Step 107 of FIG. 4, the spherical aberration error signal B is judged to be B≧ϵ, and the focal target point is reconfigured in the "in focus" direction in Step 109 of FIG. 4.

Here, if the focal target point is moved to the "in focus" side, for example, by 0.1 μm, the spherical aberration error signal A will be detected in Step 102 of the next FIG. 4. A characteristic curve of this spherical aberration error signal A becomes a new characteristic curve that is about a half of the characteristic curve of the spherical aberration error signal A shown in FIG. 2 and FIG. 5. For this reason, if the spherical aberration correction element 7 is activated in the next Step 103 of FIG. 4, the amount of spherical aberration is adjusted to about −0.03 $\lambda_{rms}$ by this new characteristic curve.

It is possible to drive the amount of spherical aberration into the vicinity of zero by repeating the same procedure hereafter. That is, in this first enforcement, even if the focusing error signal of the optical pickup 1 has an offset, it is possible to correct the focus offset and spherical aberration properly, consequently the excellent light spot 40 with small spherical aberration can be formed suitably according to a mounted optical disk 20 and its information recording layer, and thus the recording quality can be improved.

Apart from this adjustment, if the optical pickup 1 has astigmatism, there is a problem that a focal position at which the amplitude of the push-pull signal becomes the largest shifts from a focal position at which the amplitude of the reproduced information signal becomes the largest.

In this first embodiment, the final spherical aberration is determined in Step 108 of FIG. 4 based on the spherical aberration error signal B. In particular, in this first embodiment, an information signal consisting of long marks/spaces is used as the reproduced information signal, which is intended to make the information signal impervious to an influence of astigmatism as compared to an information signal consisting of short marks and short spaces. This is because it is possible to make small the amount of focus offset at which the amplitude of the reproduced information signal becomes the largest in an optimal state of spherical aberration. Where the correction is performed based on the amplitude of the reproduced information signal consisting of short marks and short spaces, the light spot 40 on the optical disk 20 takes a shape whose size is reduced most in the tangential direction of the disk. However, it expands in the radial direction of the disk. Because of this, crosstalk between adjacent tracks increases, and consequently reproduction performance deteriorates worse than that under optimal conditions, ands sometimes cross-erase may occur; a caution must be paid for this.

Note that this invention is not limited to the spherical aberration correction procedure described above. Alternatively, the following procedure may be adopted: first, the focus offset and spherical aberration are coarse-adjusted by using the spherical aberration error signal A based on the amplitude of a push-pull signal, thereafter the trial writing is executed, and the focus offset and spherical aberration are fine-adjusted by using the spherical aberration error signal B based on the amplitude of the reproduced information signal. Moreover, in the final adjustment of Step 108, the adjustment may be performed so that jitter becomes best without using the spherical aberration error signal B, or the adjustment may be performed so that the amplitude of the reproduced information signal becomes the largest.

Figure 7:
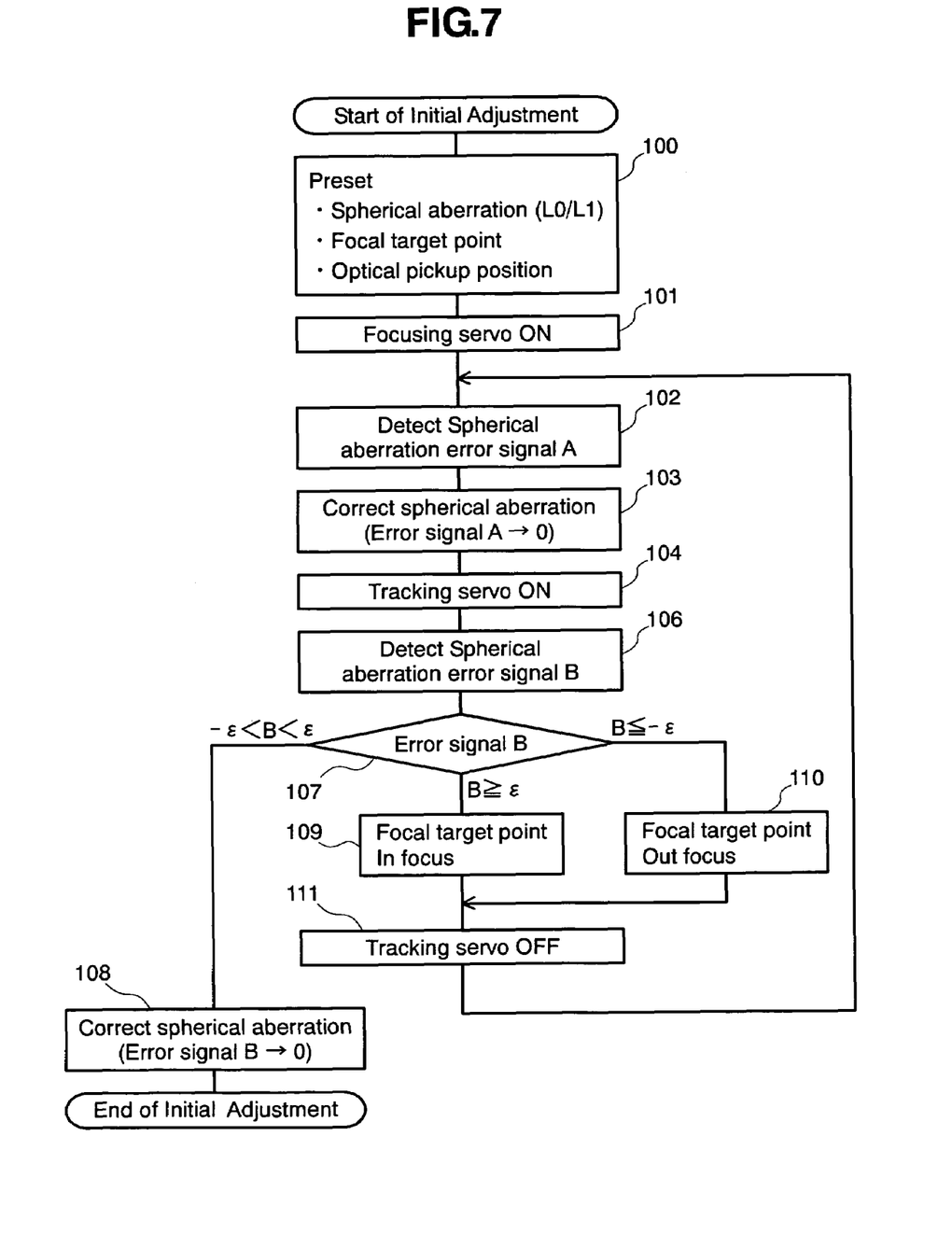
FIG. 7 is a flowchart showing one concrete example of initial operations for adjusting the spherical aberration and focus offset at the time of reproducing information from the optical disk of the first embodiment shown in FIG. 1.

The foregoing is explanation as to recording of a blank write-once optical disk. Next, an initial procedure for adjusting the spherical aberration and focus offset when reproducing recorded information from the optical disk 20 will be described. FIG. 7 is a flowchart showing one concrete example of the initial procedure for adjusting the spherical aberration and focus offset in such reproduction of information. In the figure, steps corresponding to those in FIG. 4 are denoted with the same reference numerals and repeated explanation is omitted.

In FIG. 7, when reproducing an information signal from the optical disk 20, unlike the case of a blank write-once optical disk, positioning of the optical pickup in Step 100 is performed so that the light spot 40 is positioned not in the trial writing area but in a predetermined area where an information signal to be reproduced is recorded, and the flowchart in FIG. 7 is one in FIG. 4 from which Step 105 was excluded.

The spherical aberration error signal B detected in Step 106 is based on the amplitude of the reproduced information signal of random data already recorded on the optical disk 20, being equivalent to one that is detected based on the amplitude of the reproduced information signal of a fixed pattern of long marks/spaces.

Regarding other respects, this adjustment is the same as the adjustment when recording a blank write-once optical disk, and even if the focusing error signal of the optical pickup 1 has an offset, the focus offset and spherical aberration can be corrected properly. Consequently, it becomes possible to form an excellent light spot with small spherical aberration suitably according to the mounted optical disk 20 and its information recording layer, and the reproduction quality can be improved. In addition, the reproduction procedure is applicable to the writing of additional information on the optical disk on which some information has been recorded beforehand.

Note that, as initial adjustment described above, the optical disk apparatus may be configured so that the initial adjustment is executed at predetermined positions in the optical disk 20, one near the inner peripheral part and one near the outer peripheral part, and for an area between the inner peripheral part and the outer peripheral part, adjustment of the spherical aberration and focus offset is done by interpolation based on correction conditions of the spherical aberration and focus offset that have been obtained by the initial adjustment.

A procedure of inter-layer jump either at a write-once optical disk having dual information recording layers or in reproducing information signals from an optical disk having dual information recording layers on which information signals have already been recorded is also realizable in conformance with the initial procedure of adjustment described above. For example, when jumping from the layer L0 to the layer L1 of the optical disk 20, the focusing servo is switched to an inoperative state and then the initial adjustment is started in the FIG. 7. First, in Step 100, the spherical aberration correction element 7 is set to a preset value corresponding to the Layer L1; in Step 101, the focusing servo is activated for the Layer L1; and in Step 102 and thereafter, all that is necessary is to follow the same procedure as in FIG. 4 or FIG. 7.

As explained above, in the first embodiment, by using a difference in a characteristic of amplitude deterioration versus defocus caused by spherical aberration between the push-pull signal and the reproduced information signal, accurate and stable correction of the spherical aberration is possible not only when information signals are reproduced from the optical disk but also when a blank write-once optical disk is recorded. Consequently, this invention can provide an optical disk apparatus that excels in the recording quality and reproduction quality.

Figure 8:
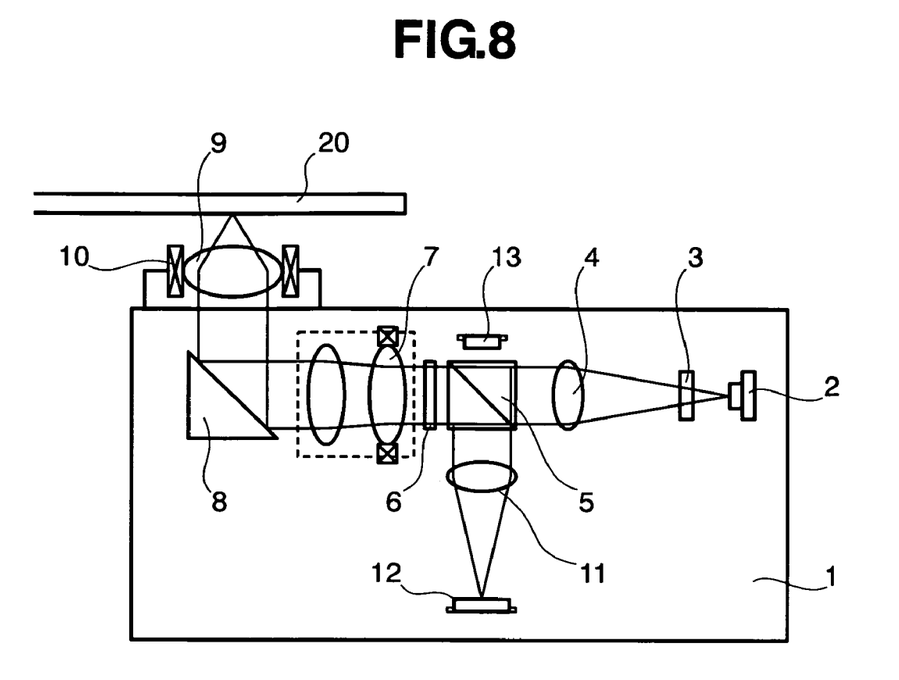
FIG. 8 is a block diagram showing the second embodiment of the optical pickup according to this invention.

FIG. 8 is a configuration showing the second embodiment of the optical pickup according to this invention, and the numeral 3 is a hologram element. Other constituent parts corresponding to those in FIG. 1 are designated by the same reference numerals, and repeated explanation is omitted. Moreover, the construction of the optical disk apparatus using this optical pickup is the same as the first embodiment of the optical disk apparatus shown in FIG. 1.

In FIG. 8, a beam of linear polarization emitted from the laser light source 2 is divided into three beams: the zero-order diffracted beam and the ± first-order diffracted beams, by the hologram element 3.

Figure 9:
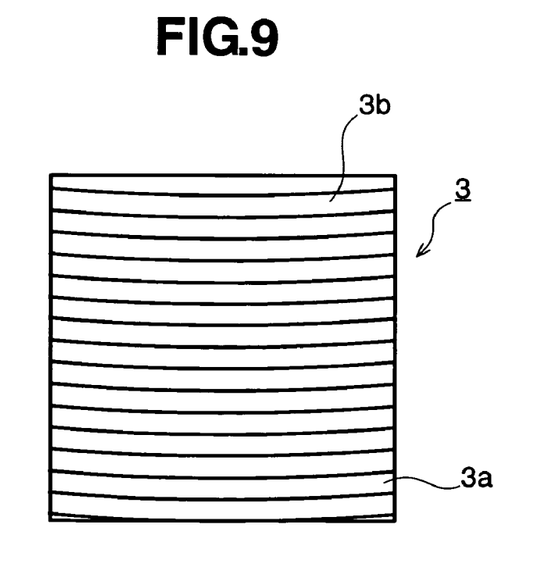
FIG. 9 is a plane view showing one concrete example of the hologram element in FIG. 8.

FIG. 9 is a plane view showing one concrete example of this hologram element 3, which is constructed, as shown in the figure, in such a way that a diffraction grating 3b is engraved on a single side of a planar parallel plate 3a, such as of glass, with a grating pitch being set according to a diffraction angle, similarly with a three-spot diffraction grating used in the common optical pickup. In this embodiment, the diffraction grating is specified as a circular arc diffraction grating whose arcs are on predetermined concentric circles so as to give predetermined lens powers to the ± first-order diffracted beams. Note that signs of the lens powers given to the (+) first-order diffracted beam and the (−) first-order diffracted beam are mutually inverted; for example, if the (+) first-order diffracted beam is given a lens power $\phi$, the (−) first-order diffracted beam is given a lens power $-\phi$. That is, with reference to the zero-order diffracted beam, the (+) first-order diffracted beam is a convergent beam and the (−) first-order diffracted beam is a divergent beam.

Returning to FIG. 8, the three beams separated by the hologram element 3 are converted to the collimated beams by the collimator lens 4. Note that, in this second embodiment, since the zero-order diffracted beam, the (+) first-order diffracted beam, and the (−) first-order diffracted beam differ slightly in divergence angle when entering the collimator lens 4, if the zero-order diffracted beam is strictly converted to the collimated beam, the (+) first-order diffracted beam will become a slightly convergent beam and the (−) first-order diffracted beam will become a slightly divergent beam.

The polarizing beam splitter 5 has a function of transmitting predetermined linearly polarized light roughly 100% and reflecting linearly polarized light orthogonal to this linearly polarized light roughly 100%, as with the first embodiment, and is disposed so as to transmit the beam emitted from the laser light source 2 roughly 100%. The beams having passed through this polarizing beam splitter 5 is then converted to circularly polarized light by the quarter-wave plate 6, imparted predetermined spherical aberration by the spherical aberration correction element 7, and subsequently guided to the objective lens 9 after being reflected by the total reflection mirror 8.

The objective lens 9 forms three light spots in the information recording layer, which is an object of the light spots, of the optical disk 20 corresponding to the three beams that were made to enter. Note that, as described above, since the three beams differ slightly from one another in a convergence/divergence state, the three formed spots focus at three focal points that differ slightly from one another in the focusing direction. That is, if taking the main spot by the zero-order diffracted beam as a reference, the (+) first-order subspot by the (+) first-order diffracted beam is slightly in defocus in the "in focus" direction, and the (−) first-order subspot by the (−) first-order diffracted beam is slightly in defocus in the "out focus" direction. These amounts of defocus can be arbitrarily set by means of a hologram form of the hologram element 3; for example, its features are specified to have intervals of 0.2 μm, respectively.

The reflected beams from the optical disk 20 pass through the objective lens 9, the total reflection mirror 8, and the spherical aberration correction element 7 again, and are converted to linearly polarized light that is orthogonal to the linearly polarized light emitted from the laser light source 2 with the quarter-wave plate 6. This reflected beams of linear polarization are reflected roughly 100% by the polarizing beam splitter 5, converted to predetermined convergent beams by the detection lens 11, and guided to the photodetector 12 after being imparted astigmatism suitable for focusing error detection by the astigmatic method with the use of, for example, a cylindrical lens.

Figure 10:
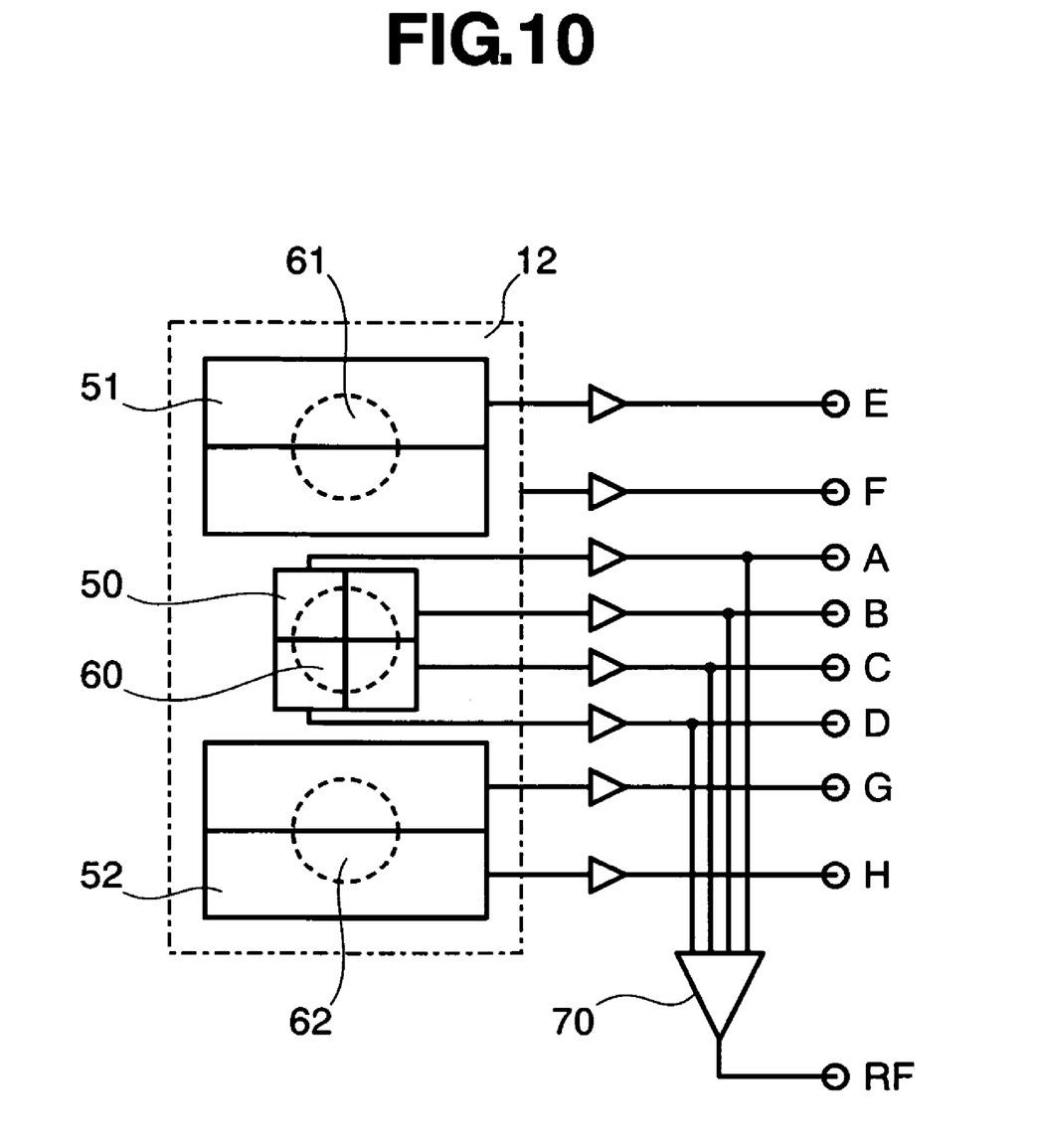
FIG. 10 is a configuration showing one concrete example of the photodetector in FIG. 8.

FIG. 10 is a configuration showing one concrete example of the light-receiving surface of this photodetector 12, where 50 to 52 are light-receiving areas, 60 is a main spot, 61 is a (+) first-order subspot, 62 is a (−) first-order subspot, and 70 is an adder.

In FIG. 10, the light-receiving surface of the photodetector 12 consists of three light-receiving areas of the light-receiving areas 50, 51, and 52. Moreover, the light-receiving area 50 is divided into four areas by parting lines lying in the tangential direction and in the radial direction of the optical disk 20, and the light-receiving areas 51, 52 are divided into two areas, respectively, by a parting line lying in the tangential direction of the optical disk 20. The light-receiving area 50 receives the main spot 60 of the zero-order diffracted beam, and areas that have been divided into four therefrom output respective signals A, B, C, and D. The light-receiving area 51 receives the (+) first-order subspot 61 of the (+) first-order diffracted beam, and areas that have been divided into two therefrom output signals E, F, respectively. In addition, the light-receiving area 52 receives the (−) first-order subspot 62 of the (−) first-order diffracted beam, and areas that have been divided into two therefrom output signals G, H, respectively.

The outputs A to D of the light-receiving area 50 are summed in the adder 70 in the reproduced signal generation circuit 32 (FIG. 1), which gives a reproduced information signal RF. Moreover, in the light-receiving areas 51, 52, the cutoff frequency fc satisfies the following condition, $$fc > fn \tag{1}$$

where fn is a frequency corresponding to a combination of the longest marks and the longest spaces recorded on the optical disk 20.

The output signals A to H of the photodetector 12 are supplied to the servo signal generation circuit 33 (FIG. 1), which generates various servo signals. The focusing error signal is generated by the astigmatic method, namely by the following expression (2), that is, by calculation processing.

$$(A+C)-(B+D) \tag{2}$$

Incidentally, in the case where this astigmatic method is employed, a cylindrical lens is disposed between the detection lens 11 and the photodetector 12 in FIG. 8. The first tracking error signal is generated based on phase differences in outputs of output signals A to D by the differential phase detection method (DPD method). The second tracking error signal is generated, by the differential push-pull method, according to the following expression (3), that is, by calculation processing.

$$\{(A+B)-(C+D)\}-k\{(E-F)+(G-H)\} \quad (3)$$

Here, k is a predetermined constant that varies depending on a level ratio between a total of output signals of the light-receiving area 50 by the main spot 60 and a total of output signals of the light-receiving areas 51, 52 by the (+) first-order subspot 61 and the (−) first-order subspot 62.

In this second embodiment, a configuration of the optical pickup in which output signals from the light-receiving areas 51, 52 are mutually independent makes it possible to detect push-pull signals and sum signals (reproduced signals) for the main spot 60 and for the (+) first-order subspot 61 and the (−) first-order subspot 62, respectively. In particular, the light-receiving areas 51, 52 for these subspots 61, 62 are constructed so as to satisfy the frequency characteristic shown by the expression (1), whereby the detection of the reproduced signal with the subspots 61, 62 is made possible.

Note that, in this second embodiment, the ± first-order subspots 61, 62 are made to be in defocus with reference to the main spot 60 by a predetermined quantity in mutually reverse directions, as described above.

Thereby, the optical pickup is configured so that the spherical aberration error signal A based on the amplitude of the push-pull signal explained in the first embodiment described above is detected as a difference between the amplitudes of the push-pull signals of the (+) first-order subspot 61 and of the (−) first-order subspot 62 (namely, the push-pull signal of the (+)first-order subspot 61 is a differential signal of the output signal E subtracted by the output signal F of the light-receiving area 51, and the push-pull signal of the (−) first-order subspot 62 is a differential signal of the output signal G subtracted by the output signal H of the light-receiving area 52). Moreover, the optical pickup is configured so that the spherical aberration error signal B based on the amplitude of the reproduced signal (namely, the reproduced signal of the (+) first-order subspot 61 is a sum signal of the output signals E, F of the light-receiving area 51, and the reproduced signal of the (−) first-order subspot 62 is a sum signal of the output signals G, H of the light-receiving area 52) is detected as a difference between the amplitudes of the push-pull signals of the (+) first-order subspot 61 and of the (−) first-order subspot 62.

By configuring the optical pickup 1 in such a way as described above, the spherical aberration error signals A, B can be detected without adding the focus offset as in the case of the first embodiment. In particular, the spherical aberration error signal B is a signal that can be detected even during a tracking servo operation, and consequently it becomes possible to detect the spherical aberration error signal B in real time during recording/reproduction operations. In addition, the optical pickup according to this invention is composed of constituent parts that are almost the same as those of the common optical pickup, can be realized with slight alteration of parts, and hence excels in ease of assembly and anti-environmental reliability equally to the conventional common optical pickup.

The second embodiment of the method for recording/reproducing an optical disk and the optical disk apparatus according to this invention that uses the optical pickup 1 shown in FIG. 8 will be described. This optical disk apparatus of the second embodiment has the same configuration as that of the first embodiment (shown in FIG. 1) except for the optical pickup 1, and explanation of its configuration is omitted in this description.

First, an initial procedure for adjusting the spherical aberration and focus offset for a blank write-once optical disk of this second embodiment will be described. However, since a basic initial procedure of adjustment is the same as that of the first embodiment, the difference with the case of the first embodiment will be mainly explained referring to the previous FIG. 4 and FIG. 10.

In FIG. 4, Step 100 and Step 101 are the same as in the first embodiment.

In Step 102, the amplitude of the push-pull signal (E−F) of the (+) first-order subspot 61 and the amplitude of the push-pull signal (G−H) of the (−) first-order subspot 62 are detected, and the spherical aberration error signal A is generated from difference calculation on them. The second embodiment differs from the first embodiment in that this spherical aberration error signal A is detected without changing a current focal target point being set. Incidentally, as described above, the push-pull signal (E−F) of the (+) first-order subspot 61 is a differential signal of the outputs E, F of the light-receiving area 51 of the photodetector 12, and similarly the push-pull signal (G−H) of the (−) first-order subspot 62 is a differential signal of the outputs G, H of the light-receiving area 52 of the photodetector 12. This remains the same also in the following explanation.

Steps 103 to 105 are the same as in the first embodiment.

In Step 106, the amplitude of the reproduced signal (E+F) by the (+) first-order subspot 61 and the amplitude of the reproduced signal (G+H) by the (−) first-order subspot 62 are detected, respectively, and the spherical aberration error signal B is generated by difference calculation of them. The second embodiment differs from the first embodiment in that this spherical aberration error signal B is detected without changing the current focal target point being set. Incidentally, as described above, the reproduced signal (E+F) by the (+) first-order subspot 61 is a sum signal of outputs E, F of the light-receiving area 51 of the photodetector 12, and similarly the reproduced signal (G+H) by the (−) first-order subspot 62 is a sum signal of the outputs G, H of the light-receiving area 52 of the photodetector 12. This remains the same also in the following explanation.

Steps 107, 108 and 111 are the same as in the first embodiment. Moreover, even in the case where the optical pickup 1 of this second embodiment has an offset of the focusing error signal caused by variation in assembly and adjustment, the focus offset and spherical aberration can be corrected properly as in the case of the first embodiment.

As described above, also in this second embodiment, it is possible to form an excellent light spot with small spherical aberration suitably according to the mounted optical disk 20 and its information recording layer, and the recording quality can be improved.

In addition, regarding the initial procedure for adjusting the spherical aberration and focus offset in reproducing information signals from the optical disk 20, its basic procedure is the same as the initial procedure of adjustment in the first embodiment shown in FIG. 7, and the detection of the spherical aberration error signals A, B is the same as that of the blank write-once optical disk. Therefore, also in this second embodiment, it is possible to form an excellent light spot with small spherical aberration suitably according to the mounted optical disk 20 and its information recording layer, and the reproduction quality can be improved.

A procedure of inter-layer jump in a write-once optical disk having dual information recording layers can be realized by generating the spherical aberration error signals A, B based on signals by the subspots, as with the initial adjustment, in conformance with the same procedure as in the first embodiment.

Figure 11:
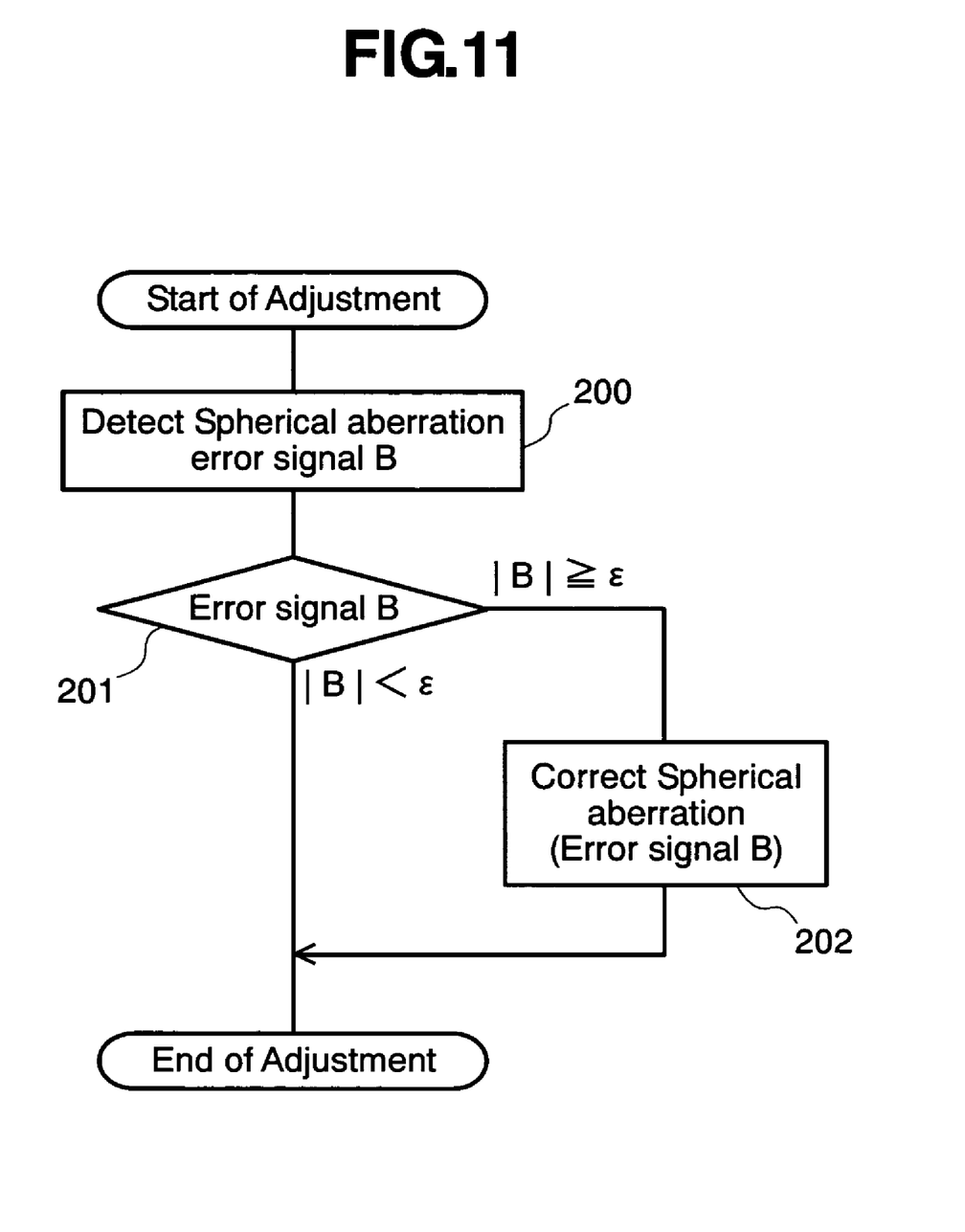
FIG. 11 is a flowchart showing one concrete example of a spherical aberration correction procedure during a reproduction operation in the method for recording/reproducing an optical disk and the optical disk apparatus according to this invention that uses the optical pickup shown in FIG. 8.

Referring to FIG. 11, one concrete example of the correction procedure of spherical aberration during the reproduction of information signals according to this second embodiment will be described. Note that in this case, because the optical pickup is being in a reproduction operation of information signals, the focusing servo is being operated at a predetermined focal target point and similarly the tracking servo is being operated at a predetermined tracking target point.

In FIG. 11, the amplitude of the reproduced signal (E+F) of the (+) first-order subspot 61 and the amplitude of the reproduced signal (G+H) of the (−) first-order subspot 62 are detected, and these amplitudes are subjected to difference calculation to generate the spherical aberration error signal B (Step 200). Next, on the basis of- previously set thresholds $+\epsilon$, $-\epsilon$, judgment processing of this spherical aberration error signal B is performed (Step 201). In this judgment processing, if the inequality $-\epsilon<B<+\epsilon$ (namely, $|B|<|\epsilon|$) stands, it is considered that the spherical aberration has been adjusted satisfactorily, and the adjustment operations are ended. Moreover, in the judgment processing of Step 201, if the absolute value of the spherical aberration error signal B is $|\epsilon|\leq|B|$, the spherical aberration is corrected by driving the spherical aberration correction element 7 (FIG. 8) in a direction corresponding to the sign of the spherical aberration error signal B by a distance corresponding to the absolute value of this spherical aberration error signal B (Step 202). If by this correction the absolute value of the spherical aberration error signal B becomes $|\epsilon|>|B|$, it is considered that the spherical aberration error has been corrected and the adjustment operation is ended. Incidentally, this Step 202 may consist of a loop in which the step of detecting the spherical aberration error signal B and the step of correcting the spherical aberration based on this detected spherical aberration correction element 7 (FIG. 8) are repeated together with the step of judging the end of correction based on this spherical aberration error signal B.

The above adjustment processing operations may be performed in any one of the following manners: the operations are done repeatedly at regular intervals during an information reproducing operation; the operations are started each time a predetermined position information is reproduced from the optical disk 20; and the operations are started on the basis of the amount of temperature change in the optical disk apparatus.

Here, the difference between the above spherical aberration error signals A, B will be described.

Since the spherical aberration error signal A is a signal based on the amplitude of the push-pull signal, it enables the spherical aberration to be detected for a blank optical disk. However, the spherical aberration cannot be detected unless the tracking servo is in the inoperative state, and consequently it is unsuitable to detect the spherical aberration error in real time during continuous recording/reproduction operations. Contrary to this, since the spherical aberration error signal B is a signal based on the reproduced information signal of the optical disk, no spherical aberration can be detected unless any signal is recorded on the optical disk. However, the spherical aberration error signal B enables the spherical aberration to be detected while the tracking servo is in operation, and consequently is suitable for detecting the spherical aberration in real time. This invention makes possible the detection of the spherical aberration of a blank disk and real time detection.

It should be noted here that it is possible to correct the spherical aberration based on only the push-pull signal or the reproduced information signal. However, as described above, in the case where the correction of the spherical aberration is performed only with a signal based on the amplitude of the push-pull signal, if there is a focusing error signal offset and/or astigmatism caused by assembly error of the pickup etc, it is difficult to correct the spherical aberration accurately.

On the other hand, in the case where the correction of the spherical aberration is performed only with a signal based on the reproduced information signal, an adjustment signal cannot be obtained for a completely unrecorded write-once disk. If the trial writing is performed with adjusting nothing at all, occasionally there is a case where the recording is preformed with both defocus and spherical aberration being set to a large degree, and hence a signal with sufficient quality to be used as an adjustment signal is not recorded. In such a case, it is necessary to perform the trial writing repeatedly while changing defocus and spherical aberration adequately until a signal of required quality is recorded. Therefore, this method is unsuited to the write-once disk, especially, whose trial writing area is limited.

In contrast to these methods, according to the method of using both the signal based on the push-pull signal and the signal based on the reproduced information signal that is this invention, the quality of recorded information signals can be secured and the number of trial writing can be reduced by performing coarse adjustment with the signal based on the push-pull signal to a blank write-once disk and then performing the trial writing. Moreover, the simultaneous use of the push-pull signal and the reproduced information signal makes it possible to separate the defocus-caused shift and the spherical aberration-caused shift and to correct them accurately, respectively, even when there are the focusing error signal offset and astigmatism.

What is claimed is:

1. A method for recording and reproducing an optical disk wherein a beam on an optical disk is focused using an optical pickup, a reflected beam from said optical disk is detected by a photodetector, a focusing error signal is detected from output signals of the photodetector, and a tracking error signal is detected by the push-pull method, the method comprising the steps of:

detecting push-pull signals and reproduced information signals in a state of "in focus" and in a state of "out focus," respectively;

detecting a first spherical aberration error signal that varies depending on the amplitudes of said push-pull signals in the state of "in focus" and in the state of "out focus";

detecting a second spherical aberration error signal that varies depending on the amplitudes of said reproduced information signals in the state of "in focus" and in the state of "out focus"; and correcting the spherical aberration based on said first and second spherical aberration error signals.

2. An optical disk apparatus comprising:

(1) an optical pickup composed of a light source, an objective lens for focusing a beam emitted from said light source on an information recording layer of an optical disk, an objective lens actuator, a spherical aberration correction element for adjusting the spherical aberration of a beam entering said objective lens to a predetermined value, a photodetector for receiving a reflected beam from said optical disk and detecting a focusing error signal and a tracking error signal by the push-pull method;

(2) a drive circuit for driving said objective lens actuator and setting it to either in a state of "in focus" or in a state of "out focus";

(3) means for detecting push-pull signals and reproduced information signals from outputs of said photodetector in said state of "in focus" being set and in said state of "out focus" being set, respectively;, (4) means for generating a first spherical aberration error signal that varies depending on amplitudes of said push-pull signals detected in said state of "in focus" and in said state of "out focus" and generating a second spherical aberration error signal that varies depending on amplitudes of said reproduced signals detected-in said state of "in focus" and in said state of "out focus"; and (5) means for correcting the spherical aberration of a light spot by controlling said spherical aberration correction element according to said first and second spherical aberration error signals.

* * * * *